United States Patent [19]

Norton et al.

[11] 4,389,799

[45] Jun. 28, 1983

[54] SCRUB CRUSHER

[75] Inventors: Leo A. Norton; Christopher W. Norton, both of Waimauku, New Zealand

[73] Assignee: Lyndale Holdings Limited, Waimauku, New Zealand

[21] Appl. No.: 92,938

[22] Filed: Nov. 9, 1979

[30] Foreign Application Priority Data

Nov. 10, 1978 [NZ] New Zealand ........................ 188883

Nov. 10, 1978 [NZ] New Zealand ........................ 188886

[51] Int. Cl.[3] .............................................. A01D 49/00

[52] U.S. Cl. ..................................... 37/2 R; 172/540; 172/23; 404/127; 56/503; 242/86.7; 254/297; 254/282; 254/310

[58] Field of Search ............... 254/282, 299, 309, 310, 254/297; 172/808, 23, 540, 26, 537, 26.5, 26.6, 554; 242/86.5 R, 86.7; 37/115, 2 R, 2 P; 404/127; 301/43; 56/504

[56] References Cited

U.S. PATENT DOCUMENTS

| | | | |
|---|---|---|---|
| 68,310 | 8/1867 | Paine | 172/23 |
| 2,008,612 | 7/1935 | Heath | 242/86.7 |
| 2,344,795 | 3/1944 | Weber | 254/282 |
| 2,359,778 | 10/1944 | Mork | 254/297 |
| 2,686,997 | 8/1954 | Denton | 172/540 |
| 2,825,983 | 3/1958 | Finn | 37/2 R |
| 2,870,850 | 1/1959 | Dethlefsen | 172/554 |
| 2,946,564 | 7/1960 | Cunningham | 254/282 |
| 3,242,835 | 3/1966 | Paramythioti | 404/127 |
| 4,193,457 | 3/1980 | Sphar | 172/540 |
| 4,339,908 | 7/1982 | Johnson | 56/503 |

FOREIGN PATENT DOCUMENTS

| | | | |
|---|---|---|---|
| 395476 | 3/1941 | Canada . | |
| 423908 | 11/1944 | Canada . | |
| 488548 | 12/1952 | Canada . | |
| 830324 | 12/1969 | Canada . | |
| 920573 | 2/1973 | Canada . | |
| 946196 | 4/1974 | Canada . | |
| 20342 | 10/1906 | New Zealand . | |
| 32018 | 1/1913 | New Zealand . | |
| 97503 | 7/1950 | New Zealand . | |
| 112175 | 11/1956 | New Zealand . | |
| 116720 | 9/1957 | New Zealand . | |
| 133215 | 11/1964 | New Zealand . | |
| 147876 | 1/1970 | New Zealand . | |
| 164139 | 9/1974 | New Zealand . | |
| 172661 | 3/1976 | New Zealand . | |
| 170083 | 2/1979 | New Zealand . | |
| 172660 | 2/1979 | New Zealand . | |
| 11358 | of 1891 | United Kingdom | 301/43 |

*Primary Examiner*—Richard J. Johnson

*Attorney, Agent, or Firm*—Holman & Stern

[57] ABSTRACT

A dual winch for mounting on a tractor comprises a pair of winch drums separately connected via a clutch to a common drive shaft. Each winch drum typically incorporates a planetary gear unit. The cables on the winches are connected to a roller preferably provided with double chevron blades.

11 Claims, 5 Drawing Figures

SCRUB CRUSHER

SUMMARY OF THE INVENTION

This invention relates to a winch system and roller for use on a winch vehicle typically for use in scrub clearing apparatus.

Dual winch systems for use on tractor type vehicles have been used in the past wherein both winches are driven by the motor of the vehicle. Such systems have, however, suffered from problems in the winch drive mechanism, which in turn have led to difficulties with the controlling of the roller.

In the past rollers have been provided with "V" shaped blades for crushing scrub, but these have not been entirely satisfactory in effectively crushing the scrub on cross-slopes and steep ridges, where the rollers have tended to slip sideways down the slope.

The object of the present invention is to provide a simple and effective dual-winch drive mechanism and roller which may enable more effective handling of the roller on steep slopes.

Accordingly, in a first aspect, the present invention consists in a dual winch comprising a drive input shaft, a pair of intermediate drive shafts extending in opposite directions perpendicular to the drive input shaft to be driven thereby, each intermediate shaft being connected via a clutch and a flexible joint to a winch drum.

In a second aspect the present invention broadly consists in a vehicle winch comprising a tractor vehicle, a dual winch as defined above mounted on the vehicle, the drive input shaft of the dual winch being arranged to be driven by the motor of the vehicle, a winch cable attached to each winch and passing through a cable quide fixed to the vehicle to a load, both winch cables being attached to the same load but at spaced points.

In a third aspect, the present invention consists in roller for use in crushing scrub, the roller being provided with a plurality of blades, the blades being zig-zagged along the length of the roller and having at least three straight sections.

BRIEF DESCRIPTION OF THE SEVERAL VIEWS OF THE DRAWINGS

The above gives a broad description of the present invention one preferred form of which will now be described with reference to the accompanying drawings in which:

FIG. 5 is a schematic view of a planetary gear system suitable for use in driving each winch in accordance with this invention.

DETAILED DESCRIPTION

Figure 1:
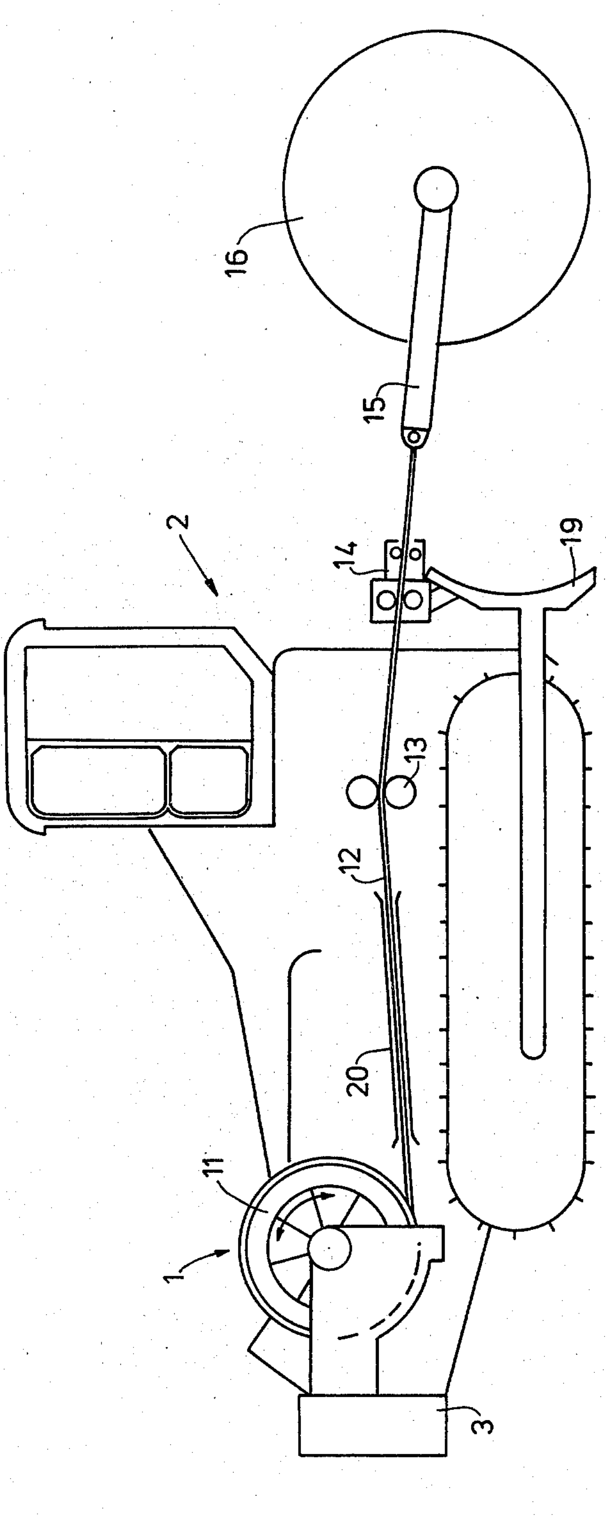
FIG. 1 is a side view of a vehicle with a winch of the present invention.
Figure 2:
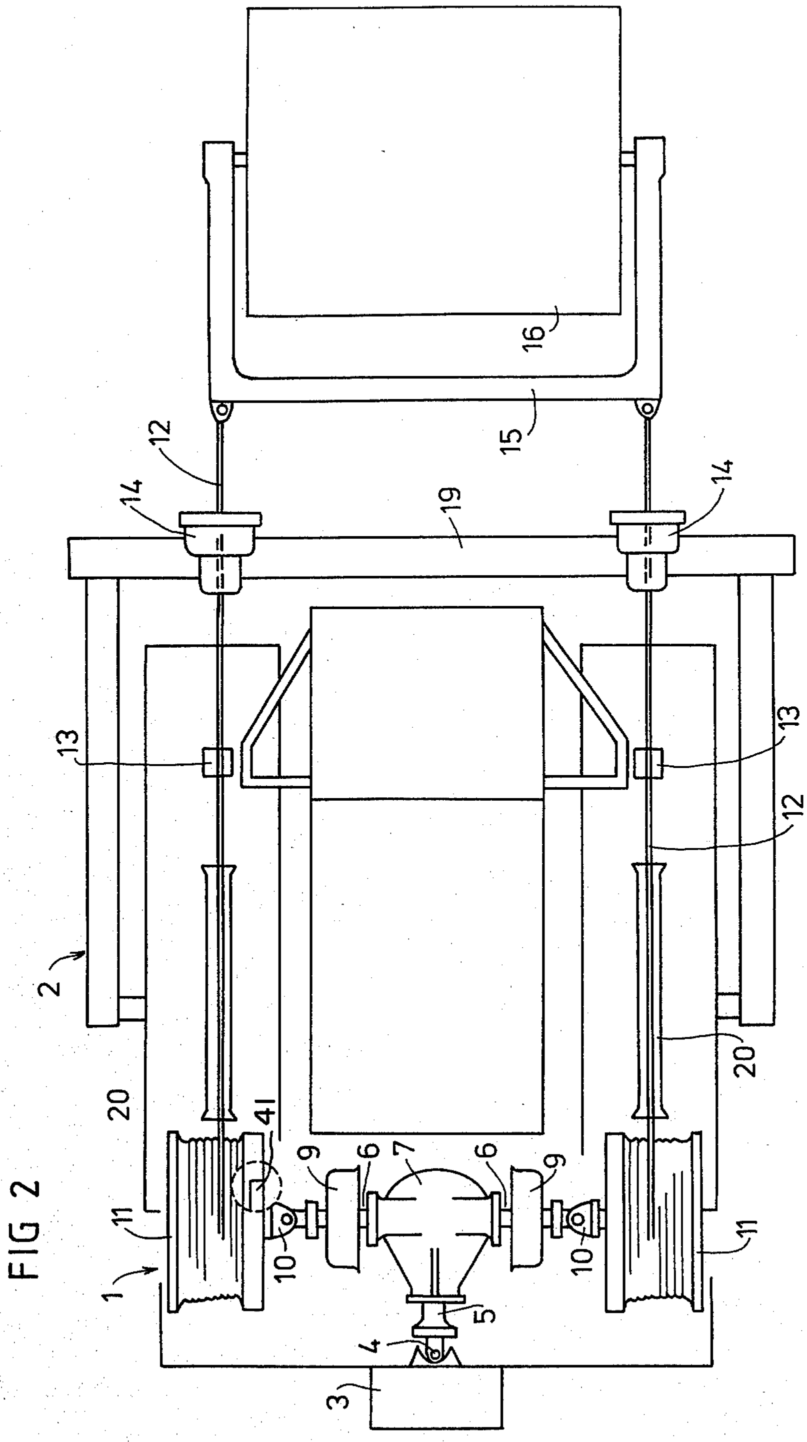
FIG. 2 is a plan view of the vehicle and winch of FIG. 1.

FIGS. 1 and 2 of the drawings show a dual winch system mounted on a tractor vehicle such as a bulldozer 2. The winch is adapted to be driven via a transfer case 3, which may comprise a gear train or a chain drive for example, from the power take off of the vehicle 2. The transfer case 3 is coupled, typically by means of a universal joint 4, to a drive input shaft 5 which is drivably connected to two intermediate drive shafts 6 which extend in opposite directions substantially perpendicular to the input shaft 5 and are connected together. The coupling from the input shaft 5 to the intermediate drive shafts 6 is typically, but not necessarily, by means of a level gear arrangement 7. Each intermediate drive shaft 6 is connected via a clutch 9 and a universal joint 10 to a winch drum 11.

The drive connection between the universal joint 10 and the respective winch drums 11 are typically by means of reduction gears.

Preferably the reduction gears are in the form of planetary gears as shown in FIG. 5. Each universal joint 10 drives a first sun gear 31, which in turn drives first planet gears via shaft 67, the first planet carrier of which (not shown) drives a second sun gear 33. Second planet gears 34 are adapted to be driven by the second sun gear 33 and are mounted on a second planet carrier (not shown). The drum is drivably connected to the second planet carrier. The ring gears 35 and 36 of both planetary systems are fixed to the gear housing and are thus held stationary. However, other forms of planetary reduction gears are possible and it is also possible to use reduction gears other than planetary gears. The preferred reduction ratio is about 10:1.

Connected to each winch drum is a winch cable 12 which passes through a pair of guide rollers 13 and a fairlead 14 to a load, typically the yoke 15 of a scrub crushing roller 16. The roller is preferably a double chevron roller, although a plain roller or single chevron roller will serve reasonably well in some circumstances. If desired the fairleads 14 may be mounted on the bulldozer blade 19 between the winch drums 11 and the cable guide rollers 13. The cable may pass through a guide tunnel 20 to protect the cable and protect it from becoming snared in the vehicle machinery. Other arrangements of cable guide may be used, however.

In use, when the winches are pulling a load, such as the drum 16, the blade 19 may dig into the ground to serve as an anchor for the vehicle 2.

Alternatively, if the vehicle 2 is not a bulldozer than some other anchoring means is preferably provided so that the vehicle is held stable while winching in the load.

Each drum 11 is provided with a braking system which may, for example, be in the form of band brakes 41, as schematically shown in FIG. 2, or disc brakes.

Figure 4:
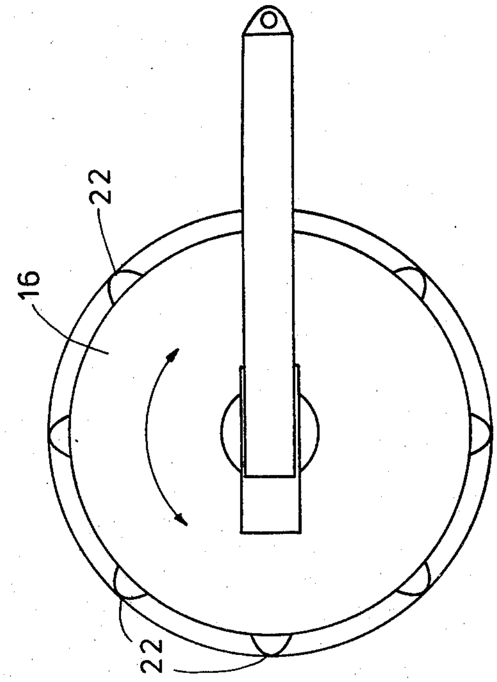
FIG. 4 is a side view of the roller.
Figure 3:
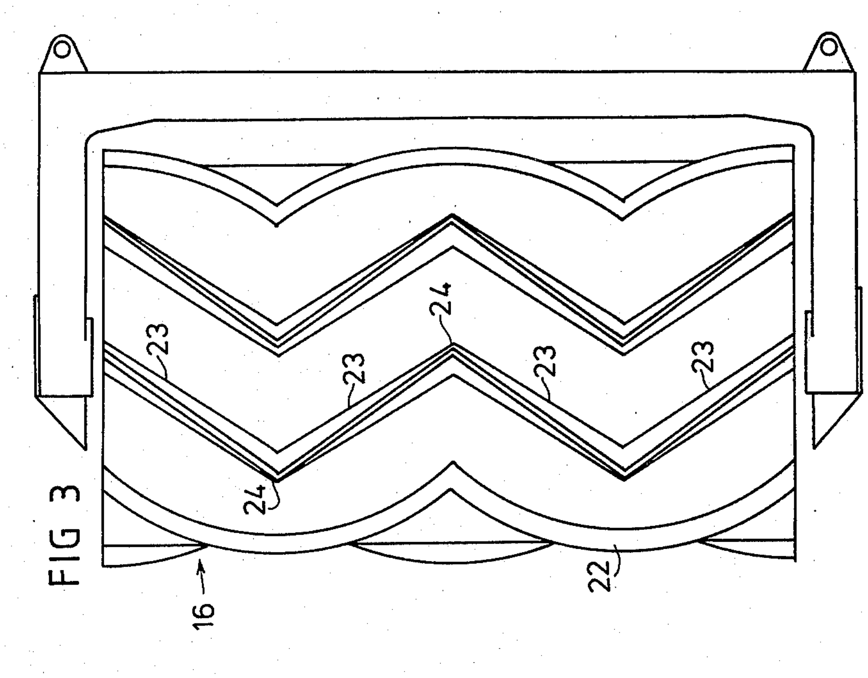
FIG. 3 is a plan view of a roller of the present invention.

FIGS. 3 and 4 of the drawings show a roller 16 with a plurality of blades 22 each blade being zig-zagged along the length of the roller and having four straight sections 23 and three zig-zag points 24. In alternative embodiments of the invention, however, there may be only three straight sections 23 and two zig-zag points 24 or, alternatively, there may be more than four straight sections.

The number of straight sections is chosen to give the optimum angle and length of each blade section for the conditions in which the roller is intended to be used. For most conditions, however, the four-section, or "double-chevron" configuration shown is preferred.

The blades preferably have a substantially triangular cross-section, as shown, for strength.

Typically, the blades are congruent: that is to say each blade is the same size and shape and has exactly the same configuration as all the others. Each of the straight sections 23 of each blade lies at the same angle with respect to the axis of the roller, except of course that each alternate section 23 lies at an angle opposite to that of each of its neighbours to form the zig-zag configuration.

The zig-zagged blades tend to hold the roller against slipping sideways down steep slopes and cross-slopes.

Many modifications to the above are possible within the scope of the present invention as broadly claimed, although many such modifications may be less preferred in most situations.

For example, the intermediate shafts 6 may be connected directly to the respective drums 11. The gear connection between the drive shaft 5 and the intermediate shafts 6 may be a reduction gear. The winch may be mounted on any convenient base, such as a trailer, a platform adapted to be set directly on the group, and so on.

The winch without the roller may be used for any of a wide variety of purposes, such as on fishing vessels for operating trawls, etc.

What we claim is:

1. A vehicle dual winch system for operating a single heavy load such as a heavy scrub crushing roller or the like comprising, a winch mounted on each side of a tractor vehicle adjacent one end thereof, each winch having a winch drum, a drive input shaft, a pair of intermediate drive shafts extending in opposite directions perpendicular to the rotational axis of said drive input shaft and operably connected together and to said drive input shaft by a bevel gear mechanism, dual clutches each of which is operably connected to an intermediate drive shaft, dual flexible joints each of which is operably connected to one of said clutches, means to connect said drive input shaft to a power take-off driven by the tractor vehicle, a planetary gear mechanism operably mounted within each winch drum and operably connecting each winch drum to the respective flexible joint, a separate winch cable operably attached to each winch drum and passing along the respective side of said vehicle, a cable guide attached to each side of said vehicle and operably engaging the respective winch cable, said cables being attached to the single roller at spaced points so that said roller can be steered by said winches.

2. A vehicle winch system as claimed in claim 1 wherein each planetary gear system comprises a first sun gear adapted to be driven by the respective intermediate shaft through said respective clutch and flexible joint, a plurality of first planet gears adapted to be driven by the first sun gear, the first planet gears being mounted on a first planet carrier adapted to drive a second sun gear, a second plurality of planet gears adapted to be driven by the second sun gear and mounted on a second planet carrier which is drivably connected to the respective drum, the first and second ring gears being connected to the gear housing.

3. A vehicle winch system as claimed in claim 2 wherein each drum is provided with a brake.

4. A vehicle winch system as claimed in claim 3 wherein each flexible joint comprises a universal joint.

5. A vehicle winch system as claimed in claim 4 wherein said roller has an elongated cylindrical shape and is provided with a plurality of circumferentially spaced blades on its outer surface, each blade being substantially triangular in cross-section and zig-zagged along the length of the roller and having at least three straight sections.

6. A vehicle winch system as claimed in claim 5 wherein the blades of the roller have four straight sections each.

7. A vehicle winch system as claimed in claim 5 wherein each straight section of the blades lies at the same angle with respect to the axis of the roller.

8. A vehicle winch as claimed in claim 5 wherein the vehicle is provided with means for anchoring the vehicle to the ground while the winch is being operated.

9. A vehicle winch as claimed in claim 8 wherein the vehicle is a bulldozer, and said anchoring means is the blade of the bulldozer.

10. A vehicle as claimed in claim 9 wherein said cable guide includes a fairlead fixed to the bulldozer blade.

11. A vehicle winch as claimed in claim 5 wherein the blades of the roller are each of substantially the same size and shape.

* * * * *